Sept. 1, 1931.　　　　F. W. DAVIS　　　　1,821,142
SHOCK ABSORBER
Filed Sept. 26, 1929
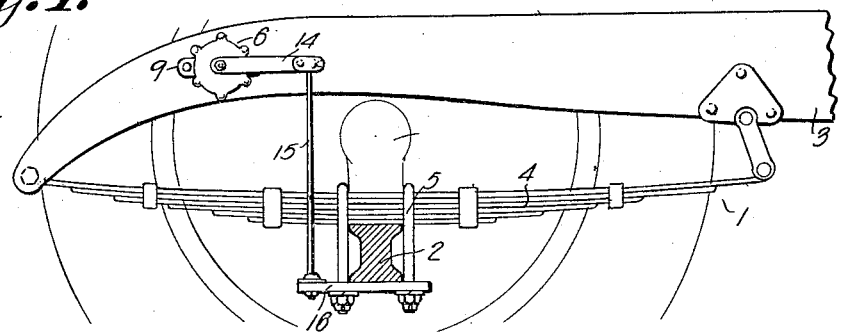
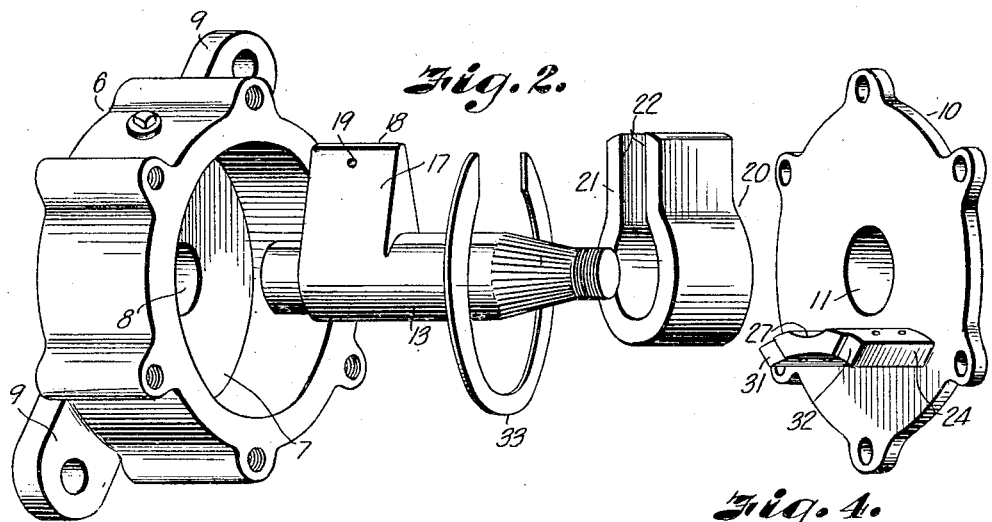
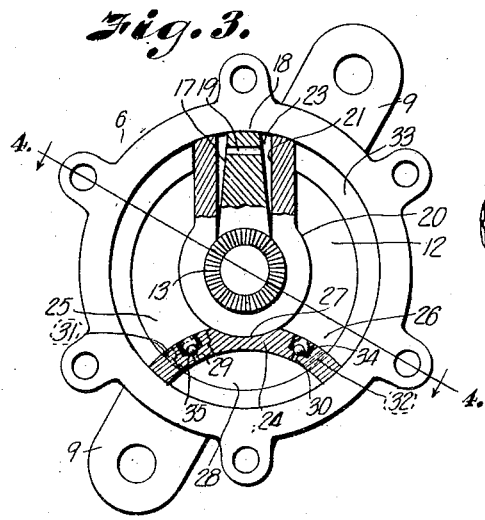
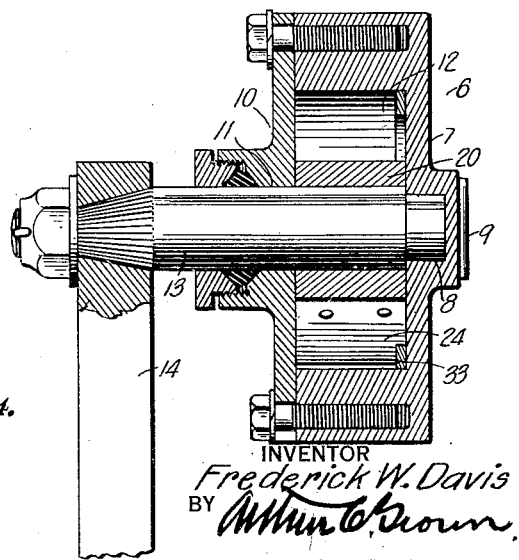
INVENTOR
Frederick W. Davis
BY
ATTORNEY Patented Sept. 1, 1931

1,821,142

UNITED STATES PATENT OFFICE

FREDERICK W. DAVIS, OF KANSAS CITY, MISSOURI; REBECCA A. DAVIS ADMINISTRATRIX OF SAID FREDERICK W. DAVIS, DECEASED

SHOCK ABSORBER

Application filed September 26, 1929. Serial No. 395,302.

My invention relates to shock absorbers and more particularly to devices of this character employing a liquid, the principal objects of the invention being to enable a shock absorber to function equally well against stresses applied in opposite directions, to combine quick acting means responsive to slight shocks with means for absorbing heavy shocks, and to effect gradual reduction in a port through which liquid is moved upon operation of the device, and to increase the strength of a liquid-using shock absorber and thereby enhance its durability and immunity to breakage and other damage.

In accomplishing these and other objects of the invention, I have provided improved details of structure, the preferred forms of which are illustrated in the accompanying drawings, wherein:

Fig. 1 is a perspective view of a portion of a vehicle including a spring and a frame member equipped with a shock absorber embodying my invention.

Fig. 2 is an enlarged detail perspective view of the improved shock absorber illustrating its members disassembled but in related position.

Fig. 3 is an end view of the housing with the cover plate removed, an arcuate partition shown in functioning position in the housing, the partition and rocking members being shown partly in section to illustrate the position of valve ports.

Fig. 4 is a section on the line 4—4, Fig. 3 including a portion of a crank arm for connecting the shock absorber with the spring.

Referring in detail to the drawings:

1 designates generally a portion of an automobile, including an axle 2, a frame member 3, a spring 4 having ends connected with the frame member, and 5 designates U-bolts adapted to attach the spring to the axle.

My invention includes a cylindrical housing or casing 6 having an open side and including a back wall 7 having a bearing opening 8 and lateral ears 9 whereby the housing may be secured to the frame member 3. A cover or front plate 10 having a central bearing opening 11 is secured to the open end of the housing to close the cylindrical chamber 12 formed thereby.

A shaft 13 is rotatably mounted in the bearing recess and opening and projects outwardly from the cover plate, and a crank arm 14 secured to the projecting end of the shaft is connected by a rod 15 with a plate 16 secured to the axle by the U-bolts so that when the spring moves with reference to the frame member, the rod will move vertically and operate the crank arm and shaft.

The housing is adapted to contain liquid, for example oil, and a radial vane or blade 17 comprising a rocking arm having converging walls is preferably formed integral with the shaft and has an edge 18 adapted for wiping engagement with the cylindrical inner periphery of the chamber as the blade rotates against the resistance of the liquid and a transverse opening or channel 19 whereby the blade may pass the liquid.

A sleeve-like U-shaped yoke 20 having an arcuate lower surface is mounted on the shaft and provided with ears or wings 21 having substantially parallel inner faces 22 spaced from the inclined faces of the blade to form tapering compartments 23. The transverse edges of the wings move in wiping relation with the cylindrical inner periphery of the housing, and the vertical edges of the blade and the yoke move in wiping relation with the back wall and cover so that liquid is retained in the housing and when the shaft rotates the blade moves toward one or another of the wings, liquid in effect passing from one compartment to another through the blade channel.

An arcuate, preferably convex partition wall 24 is fixed to the cover plate adjacent the bottom of the housing and extends across the chamber into sealing engagement with the back wall 9 and cooperates with the yoke to divide the chamber into opposite chamber portions 25 and 26. The partition is provided with a concave seat 27 at its apex with which the yoke is rotatably engaged to prevent movement of liquid from one chamber portion to another between the yoke and the partition.

The partition comprises an arch forming with the lower portion of the housing, a third chamber portion 28, and is provided with ports 29 and 30 affording communication between the two main chamber portions 25 and 26 and the chamber portion 28 under conditions presently described.

The end of the partition which engages the back wall is provided with apertures comprising notches 31 and 32 at the edges thereof which engage the inner periphery of the housing comprising channels for movement of liquid from a chamber 25 or 26 into the chamber 28 and a split rotating ring 33 is mounted in rotative sliding engagement with the back wall 7 and the inner periphery of the housing, and extending in the notches of the partition.

The ends of the ring are spaced and engaged with the outer end portions of the wings of the yoke, whereby the yoke upon rotation will move the ring in the casing.

The ring comprises a rotative circularly formed strip having portions of differing area for controlling the effective area of the notches and for this purpose its ends have greater width or diameter than its intermediate portion, the effect being that of forming the inner periphery of the ring on a curve eccentric to the axis of the outer periphery thereof. The ring halves taper symmetrically from their free ends to the point of juncture.

The ports 29 and 30 in the partition are provided with valve cages 34 and valve seats 35 for containing ball valves adapted to be opened outwardly for flow of liquid from the third chamber, a valve being seated to close a port when liquid is moved against it from one of the main chamber portions, whereby flow is restricted to the notch that is related to the seated valve.

In operating a device constructed as described, rotation of the shaft and blade in either direction due to upward or downward movement of the connecting rod will result in propulsion of the liquid in corresponding direction toward the partition. The symmetrical character of the members and particularly of the partition enables the device to operate with equal efficiency in either direction.

The cooperating blade and winged yoke are particularly useful for absorbing relatively slight shocks. When the shaft rotates responsively to a slight shock the blade will move rotatively and will be slightly restrained due to the impediment of motion because of the relatively small opening in the blade.

Should a relatively severe shock be transmitted the blade will first move toward one of the wings of the yoke and effect an initial absorption of shock, and will then engage the wing and effect rotative movement of the yoke which in turn presses on the liquid in the adjacent chamber portion and forces the liquid through the corresponding notch in the partition and into the third chamber below the arched partition.

The liquid moves with relative difficulty through the small notch into the arched chamber, displaces the valve in the opposite portion of the partition, and may move with relative freedom from the arched chamber since it passes through a notch as well as through the valved port.

The rotating yoke also pushes the ring, which due to its tapering character varies and gradually reduces the effective area of the notch opening first passed by the moving liquid. Resistance of the compressed liquid restricted by the relatively small area of the notch will usually check the yoke and shaft before the widest portion of the ring reaches the notch.

When the strain or stress of the shock ceases and the frame and spring move oppositely relative to each other, the shaft rotates in the opposite direction, the blade first taking up the initial reversal shock by means of the liquid in the small tapering compartments and then engaging the winged yoke to move the same rotatively and propel the liquid reversely through the opposite notch of the partition, through the arched chamber and through the valved port and relatively open notch opposite to that through which the moving liquid enters the arched chamber.

Under such reverse operation of the device, the right hand notch is initially reduced by the eccentric ring, but liquid is free to flow through the related valve port. A blade, yoke and ring approach normal position, the right hand notch becomes more widely open so that liquid may flow more freely therethrough.

It is apparent that slight oscillations of the blade or of the blade and wings in either direction cause restrained movement of the liquid, that the initial movements are met by relatively slight resistance and that a plurality of factors for varying the degree of resistance at successive stages in the operation of the members in one direction are provided.

Attention is particularly called to the fact that the ring affords a maximum passage or channel through a notch at the beginning of the propulsion of liquid through the notch; and that when the action is reversed and the ring moves its thickened portion away from the notch the effective opening of the notch increases gradually.

The size of the split ring will be initially adjusted to the notches in the partition proportionately to the weight on the springs of a vehicle to which it may be applied. For example, in case of a relatively heavy normal load on the springs, the ring will be formed sufficiently wide to provide relatively small passages through the partition notches, and thus increase the resistance to the flow of liquid through the partition. The blade cooperating with the wings of the yoke member will in all cases provide for quick response to relatively small shocks, and will return promptly toward normal position.

Attention is called to the fact that the blade operates over a relatively small arc and the opening in the blade permits the same to move relatively quickly through a small body of liquid in the compartments, when displacement of the frame and axle of the vehicle is slight, for permitting free action of the metal springs of the vehicle, and yet takes the shock in both directions. When this limit of displacement is exceeded, the blade immediately engages the yoke wings, and urges them against the large body of liquid in the casing.

What I claim and desire to secure by Letters Patent is:

1. In a shock absorber, a liquid containing housing, a blade rotatable in the housing, a yoke mounted on the blade having limited free movement relative to the blade and adapted to move the liquid, a partition dividing the housing into opposite portions and provided with an aperture for flow of liquid from one portion to the other, and means movable by said yoke for controlling the effective area of said aperture.

2. In a shock absorber, a liquid containing housing, a blade rotatable in the housing, a yoke movable by said blade and adapted to move the liquid, a partition dividing the housing into opposite portions and having oppositely opening valve ports, the partition having apertures for free flow of liquid from one portion to the other, and means movable by said yoke for controlling the effective areas of said apertures.

3. In a shock absorber, a liquid containing housing, a blade rotatable in the housing, a yoke movable by said blade and adapted to move the liquid, a wall in the housing having apertures for flow of liquid propelled by the yoke, and a split ring movable by the yoke in said apertures to vary the effective area of the same.

4. In a shock absorber, a housing, a blade rotatable in the housing, a yoke movable by said blade and adapted to move the liquid, a wall in the housing having apertures for flow of liquid in either direction under impulse of the yoke, and a strip located in said apertures and movable by the yoke, said strip having portions of different size for varying the effective area of the apertures.

5. In a shock absorber including a liquid-containing housing, and a blade rotatable in the housing, a yoke movable by said blade and adapted to move the liquid, a wall dividing the housing into opposite portions and having openings for flow of liquid moved by the yoke from one portion to the other, and a split ring having opposite spaced ends located adjacent the yoke and adapted to be moved thereby, said ring extending in said openings and being adapted to vary the effective areas of the same upon rotation of the yoke.

6. A shock absorber comprising a housing, a blade rotatable in the housing, a wall dividing the housing into opposite portions and having openings for flow of liquid moved by the blade from one portion to the other, and a strip having opposite ends located adjacent the blade and adapted to be engaged thereby, said strip having an intermediate portion of less width than said ends extending in said openings, the ends being adapted to reduce the effective area of the openings upon rotation of the blade.

7. In a shock absorber, a housing having a cylindrical inner wall, a blade mounted in the housing and having an edge slidable over said wall, a yoke movable by the blade having wings spaced from the blade to form liquid containing compartments, and a wall in said housing dividing the same into opposite portions and having openings for flow of liquid from one portion to the other upon movement of said yoke by the blade.

8. A shock absorber comprising a liquid containing housing, a wall at the lower end of the chamber formed by the housing having oppositely opening ports and edge notches forming channels for movement of liquid from one portion of the chamber to another, a shaft rotatable in the housing having a radial blade provided with a transverse opening, and a yoke movably mounted on the shaft having wings extending in spaced relation with said blade to form compartments on opposite sides thereof and adapted to be moved by the rotating shaft and blade for moving liquid from one portion of the housing to the other through said wall.

9. In a shock absorber, a housing forming a cylindrical chamber, a wall extending across the lower end of the chamber having edge notches and discharge ports provided with valves, rocking means in the housing for moving liquid toward said wall, and a split ring in said chamber having an inner periphery eccentric to the axis of its outer periphery and a portion extending in said notches, said ring being movable by said rocking means for controlling the effective area of the notches.

10. In a shock absorber including a cylindrical liquid-containing chamber having an apertured partition and a shaft in the chamber, imperforate wings movable on the shaft, and a blade fixed to said shaft having an opening for relatively free movement of the blade in the chamber, and adapted to move the wings against the resistance of the liquid.

11. In a shock absorber, a housing having a cylindrical inner wall, a blade mounted in the housing and having an edge slidable over said wall, a yoke movable by the blade having wings spaced from the blade to form liquid containing compartments, and an arcuate partition wall in said housing dividing the same into opposite portions and having openings for flow of liquid from one portion to the other upon movement of said yoke by the blade, said arcuate wall being convex relative to the cylindrical inner wall.

In testimony whereof I affix my signature.

FREDERICK W. DAVIS.